United States Patent [19]
Ho et al.

[11] Patent Number: 5,886,693
[45] Date of Patent: Mar. 23, 1999

[54] METHOD AND APPARATUS FOR PROCESSING DATA ACROSS A COMPUTER NETWORK

[75] Inventors: Chung-Jen Ho, San Jose; Annsheng C. Ting, Los Altos Hills, both of Calif.

[73] Assignee: Araxsys, Inc., Redwood City, Calif.

[21] Appl. No.: 902,008

[22] Filed: Jul. 29, 1997

Related U.S. Application Data

[63] Continuation-in-part of Ser. No. 546,212, Oct. 20, 1995, and a continuation-in-part of Ser. No. 546,048, Oct. 20, 1995.

[51] Int. Cl.$^6$ .................................................. G06F 3/00
[52] U.S. Cl. ......................... 345/335; 395/200.33; 707/1
[58] Field of Search .................... 345/329, 335, 345/356, 965; 395/924, 50, 183.02, 200.3, 200.31, 200.32, 200.33; 128/920; 364/468.1; 707/1–6

[56] References Cited

U.S. PATENT DOCUMENTS

| | | | |
|---|---|---|---|
| 3,831,608 | 8/1974 | Kletschka et al. | 606/233 |
| 3,910,281 | 10/1975 | Kletschka et al. | 606/232 |
| 3,916,909 | 11/1975 | Kletschka et al. | 64/35 |
| 3,931,821 | 1/1976 | Kletsckha et al. | 606/233 |
| 3,957,389 | 5/1976 | Rafferty et al. | 415/1 |
| 3,970,408 | 7/1976 | Rafferty et al. | 415/60 |
| 3,976,253 | 8/1976 | Medicus | 241/167 |
| 3,980,086 | 9/1976 | Kletschka et al. | 604/35 |
| 4,009,719 | 3/1977 | Kletschka et al. | 606/233 |
| 4,037,984 | 7/1977 | Rafferty et al. | 415/60 |
| 4,049,002 | 9/1977 | Kletschka et al. | 604/35 |
| 4,096,864 | 6/1978 | Kletschka et al. | 604/35 |
| 4,450,076 | 5/1984 | Medicus et al. | 210/242.1 |
| 4,488,322 | 12/1984 | Hunt et al. | 5/713 |
| 4,525,885 | 7/1985 | Hunt et al. | 5/713 |
| 4,567,318 | 1/1986 | Shu | 174/35 |
| 4,731,725 | 3/1988 | Suto et al. | 706/46 |
| 4,733,354 | 3/1988 | Potter et al. | 600/300 |
| 4,755,868 | 7/1988 | Hodges | 348/780 |
| 4,764,806 | 8/1988 | Altman | 348/780 |
| 4,813,013 | 3/1989 | Dunn | 345/333 |
| 4,842,394 | 6/1989 | Buchroeder | 359/716 |
| 4,920,514 | 4/1990 | Aoki | 345/441 |
| 5,077,666 | 12/1991 | Brimm | 705/2 |
| 5,090,648 | 2/1992 | Wood, IV | 248/125.3 |
| 5,127,005 | 6/1992 | Oda et al. | 395/183.02 |
| 5,147,186 | 9/1992 | Buckholtz | 417/420 |
| 5,208,748 | 5/1993 | Flores et al. | 704/1 |
| 5,216,603 | 6/1993 | Flores et al. | 704/1 |
| 5,243,531 | 9/1993 | DiPippo et al. | 364/468.07 |
| 5,253,164 | 10/1993 | Holloway et al. | 705/2 |

(List continued on next page.)

FOREIGN PATENT DOCUMENTS

| | | |
|---|---|---|
| 0 607 694 A1 | 7/1994 | European Pat. Off. |
| 1 383 811 | 2/1975 | United Kingdom . |
| 1 400 501 | 7/1975 | United Kingdom . |
| 1 403 552 | 8/1975 | United Kingdom . |
| 1 467 298 | 3/1977 | United Kingdom . |
| WO 88/01824 | 3/1988 | WIPO . |
| WO 91 00575 | 1/1991 | WIPO . |

*Primary Examiner*—A. Katbab
*Attorney, Agent, or Firm*—D'Alessandro & Ritchie

[57] ABSTRACT

A method for processing data in a computer containing a processor is described, wherein the method comprises the steps of providing at least one program object having an instruction set, and at least one set of rules responsive to input data, the set of rules being used by the processor to determine program instructions to be issued, providing a form-based user interface, accepting input data from a user of a computer system through the forms-based user interface, causing the processor to compare the input data to one or more of the rules to determine at least one next program instruction to be executed, and then causing said at least one next program instruction to be executed. The forms-based user interface comprises standard Hyper-Text Markup Language constructs, together with new work flow interface commands which, depending on the information submitted to or received from the work flow process through one or more user interfaces, may alter that work flow process.

4 Claims, 3 Drawing Sheets

U.S. PATENT DOCUMENTS

| | | | |
|---|---|---|---|
| 5,255,358 | 10/1993 | Busboorn et al. | 345/339 |
| 5,272,704 | 12/1993 | Tong et al. | 395/183.02 |
| 5,337,402 | 8/1994 | Kitagawa et al. | 345/433 |
| 5,404,292 | 4/1995 | Hendrickson | 600/301 |
| 5,412,804 | 5/1995 | Krishna | 707/2 |
| 5,432,932 | 7/1995 | Chen et al. | 395/673 |
| 5,471,382 | 11/1995 | Tallman et al. | 600/300 |
| 5,539,869 | 7/1996 | Spoto et al. | 345/336 |
| 5,608,898 | 3/1997 | Turpin et al. | 707/201 |
| 5,640,501 | 6/1997 | Turpin | 707/507 |
| 5,644,778 | 7/1997 | Burks et al. | 705/2 |
| 5,660,176 | 8/1997 | Iliff | 600/300 |

METHOD AND APPARATUS FOR PROCESSING DATA ACROSS A COMPUTER NETWORK

CROSS-REFERENCE TO RELATED APPLICATIONS

The present application is a continuation-in-part application of copending U.S. patent application Ser. No. 08/546,212, filed Oct. 20, 1995, in the names of inventors Kenneth I. Macrae, Annsheng C. Ting, Chung-Jen Ho, Ragnar W. Edholm, Toshikazu Matsumoto, Robert B. Sigmon, Jr., and Erik Worth, and commonly assigned herewith. The present application is also a continuation-in-part application of copending U.S. patent application Ser. No. 08/546,048, now U.S. Pat. No. 5,786,816, filed Oct. 20, 1995, in the names of inventors Kenneth I. Macrae, Annsheng C. Ting, Chung-Jen Ho, Ragnar W. Edholm, Toshikazu Matsumoto, Robert B. Sigmon, Jr., and Erik Worth, and commonly assigned herewith. The entirety of these applications are hereby incorporated herein by reference as if fully set forth herein.

BACKGROUND OF THE INVENTION

1. Field of the Invention

The present invention relates to an apparatus and method for processing data across a computer network. More particularly, the present invention relates to a method for processing data wherein Hyper-Text Markup Language (HTML)-based forms having special program object tags are used to interact with program objects and a database responsive to those special attributes.

2. The Background Art

Recently, it has become quite common for a user of a networked computer to retrieve information contained within a database, such as when using an Internet search tool to locate network nodes containing information regarding a common subject matter, or to provide new data for inclusion into the database, such as when signing up for a mailing list or when registering for a drawing.

In order to retrieve data from a database, a user must typically provide certain information that the particular database recognizes and understands, and information which causes the proper search to be executed so that results of that search may later be transmitted to and displayed for the user. One way to ensure that the proper information is provided by the user involves using forms which by their nature inform the user as to what type of information is required, and which contain areas (as in a monitor screen) for providing that information. Once the proper information is provided, the database is queried, and any data resulting from that query is transmitted to and displayed for the user.

It is typical that a user of a client computer use a program called a web browser to display information transmitted to that client computer from other computers on a network, such as computers on the Internet. A web browser is a program on the client computer which receives network information from external sources, and typically displays that information to a user of the client computer. Examples of common web browsers include Netscape 3.0, available from Netscape Communications of Mountain View, Calif., and Internet Explorer, available from Microsoft Corporation of Seattle, Washington.

Information intended for use in a web browser typically contains descriptors defined in the Hyper-Text Markup Language (HTML), a language that web browsers routinely interpret.

FIG. 1 is a flow chart depicting the flow of information in a prior art method for querying a database and then providing the results of that output to a user.

Referring to FIG. 1, at step 10 a form suitable for requesting data from a database is provided to the user, and information relevant to the query of that database is entered by the user into the form. It is common for forms used across networks to be written in HTML, because these forms may then be easily transmitted as text across a network for display at locations remote from the server which originated the form.

At step 12, the query information supplied by the user is transmitted to a server computer, and is processed by a Common Gateway Interface (CGI) program, typically resident on a server computer. The primary function of a CGI program is to take output from one program and format that output so that it may be recognized as proper input to another program, hence the term "gateway". Here, the CGI program takes query data in HTML form, and converts that query information into a format which will be readily recognized by the database program. One such format in common use is the Structured Query Language (SQL) used in modern databases. If the database is of the type which recognizes SQL, the CGI program would be written to convert the HTML-based user input into SQL. The data, when transmitted to the database, would result in a valid search being performed.

At step 14, the database processes the SQL query and outputs the results to the CGI program. At step 16, the output of the database is converted to HTML format for ease of transmission and display. At step 18, the HTML information is transmitted from the server computer to the client computer, and at step 20, the HTML information containing the results of the database query is displayed on the client computer using a program suitable for that purpose such as a web browser as previously described.

Although useful for its intended purposes, this prior art method fails to provide intelligent interaction between a work flow, a database, and other users. It would therefore be beneficial to provide a system wherein a user provides data through an intelligent interface to a program object which combines that data with other data in the system and then evaluates that data against one or more rules to determine a work flow path.

For instance, in a medical scenario such as that described in copending application Ser. No. 08/546,048, wherein a physician performs three tests to determine whether a sore throat is caused by bacteria or whether it is viral, the third test may not be available for 24 hours. In this instance, the result node is split, thus allowing the diagnosis and treatment to proceed based upon the preliminary data available at the time of the first visit. When the results for the third test arrive 24 hours later, a program object receiving data from a user of the system determines that all testing is complete and then, in addition to updating the database, provides information to the treating physician so that the preliminary diagnosis may be adjusted as necessary. In the prior art, the new data would be input to the database with no determination that the desired tests are complete or notification to the treating physician.

OBJECTS AND ADVANTAGES OF THE INVENTION

It is an object and advantage of the present invention to provide a system wherein a user provides data through an intelligent interface to a program object which combines that data with other data in the system and then evaluates that data against one or more rules to determine a work flow path.

These and many other objects and advantages of the present invention will become apparent to those of ordinary skill in the art from a consideration of the drawings and ensuing description of the invention.

SUMMARY OF THE INVENTION

A computerized method for managing a process flow is described, wherein the process flow has a node from which more than one process branch emerges, and a forms-based user interface comprising function tags is a source of input by a user. The forms-based user interface communicates with a program object having at least one rule associated with it. The method comprising the steps of accepting user data from a user of the process flow system through the forms-based user interface, causing a universal Common Gateway Interface program to process the user data and to communicate the results of that processing to the program object, combining the user data with other data available within the process flow system to form a first set of data, causing the program object to determine whether additional data is required to complete an analysis of which process branches leading from the node to select, causing the computer processor, if additional data is not required, to compare the first set of data with at least one rule associated with the program object to determine which process branch or branches to select and causing the selected process flow branches to be executed.

The forms-based user interface comprises standard Hyper-Text Markup Language constructs, together with new program object tags which, depending on the information submitted to or received from the work flow process through one or more user interfaces, may alter that work flow process.

DESCRIPTION OF THE PREFERRED EMBODIMENT

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
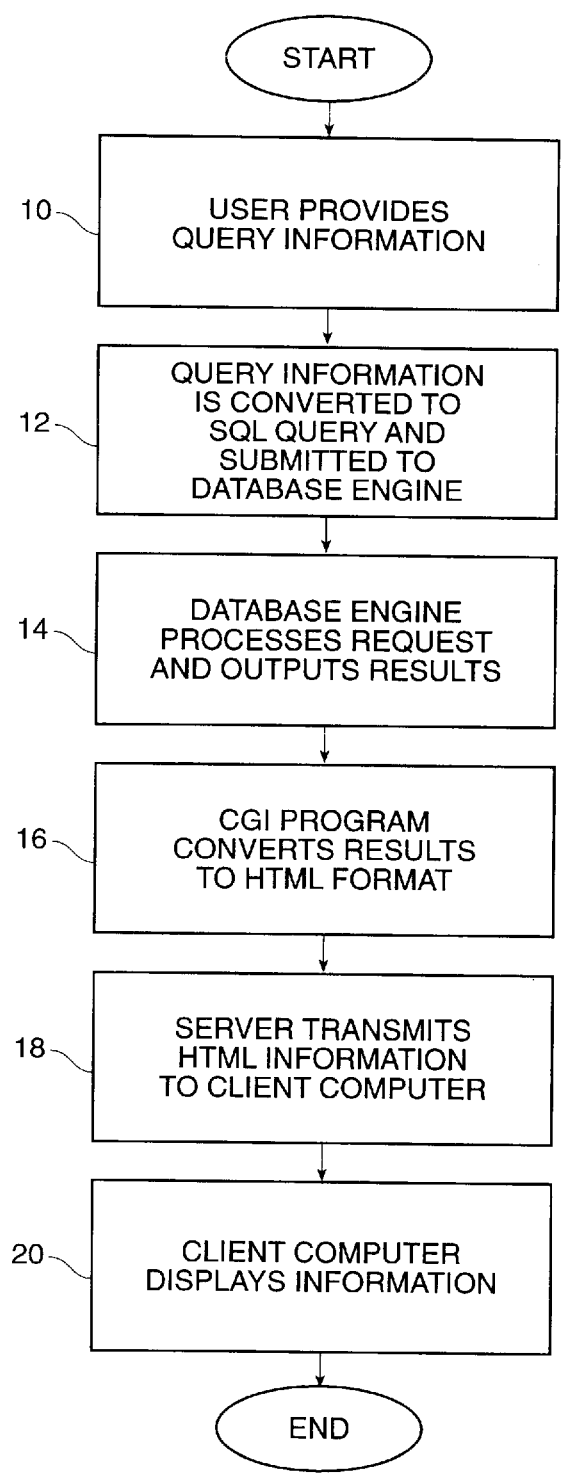
FIG. 1 is a flow chart depicting the flow of information in a prior art method for querying a database and then providing the results of that query to a user.
Figure 2:
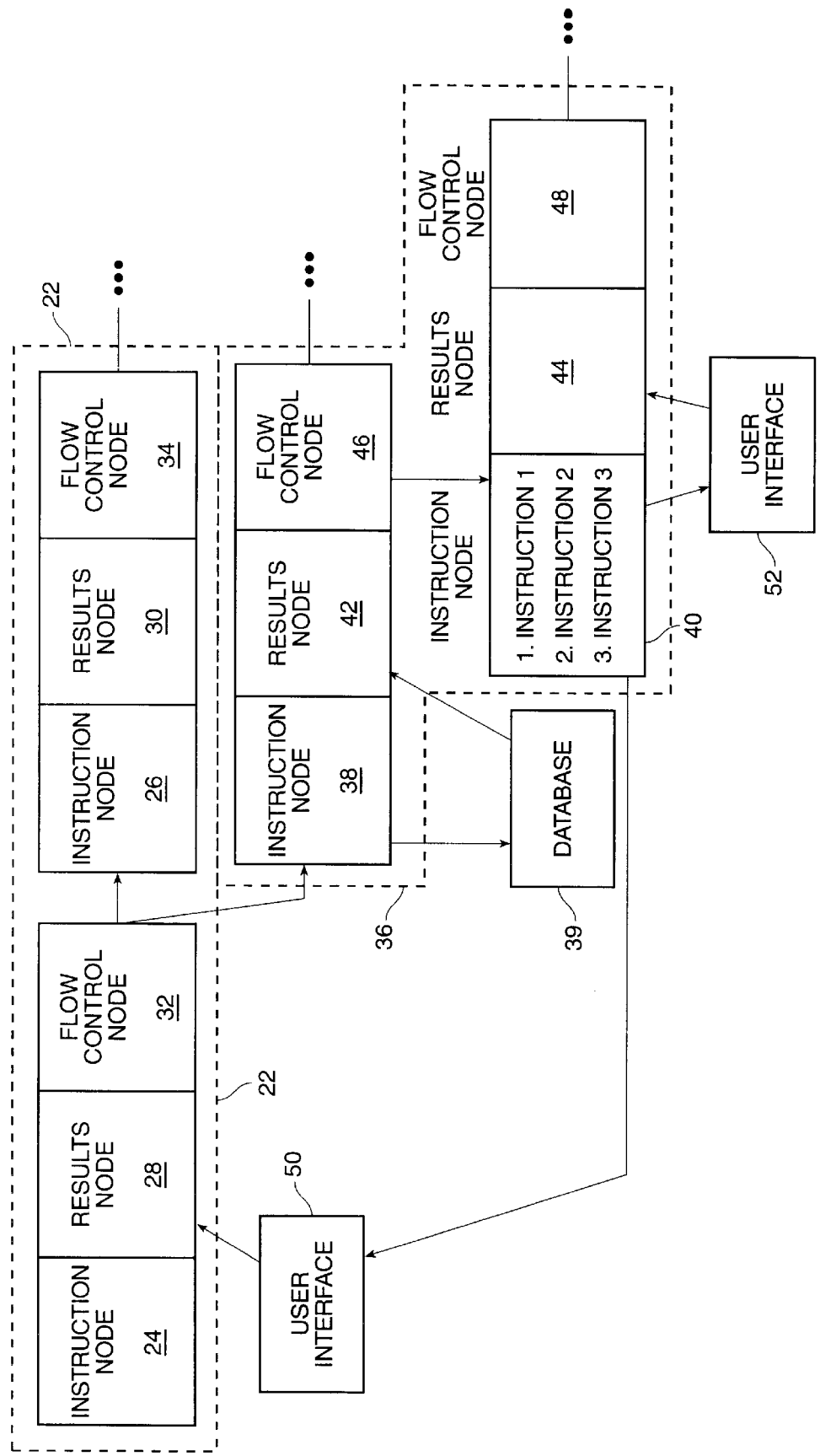
FIG. 2 is a flow chart depicting one possible flow of information according to a presently preferred embodiment of the present invention.

FIG. 2 is a flow chart depicting one possible flow of information according to a presently preferred embodiment of the present invention.

Referring to FIG. 2, a typical program object 22 comprises instruction nodes 24 and 26. Although two instruction nodes are associated with program object 22, it is just as likely for one, three, four or more instruction nodes to be associated with a program object, depending on the functions that the program object is intended to perform.

Associated with instruction nodes 24 and 26 are results nodes 28 and 30, and flow control nodes 32 and 34. As shown, program objects 22 and 36 comprise two result nodes each and two flow control nodes as shown here, it is also possible that one, three, four or more result nodes, and one, three, four, or more flow control nodes may be associated with a given program object. It is also not necessary that the number of instruction nodes, the number of result nodes, and the number of flow control nodes be equal. Thus, an instruction node may require the performance of a task which does not produce a result requiring analysis.

Instruction node 24, results node 28 and flow control node 32 are all associated specifically with each other and operate as a unit. Correspondingly, instruction node 26, results node 30 and flow control node 34 are also associated with each other and operate as one unit.

A second program object 36 comprises instruction nodes 38 and 40, results nodes 42 and 44, and flow control 46 and 48. Although the program objects 22 and 36 used herein for example purposes each have two instruction nodes, two result nodes, and two flow control nodes, it is contemplated that any number of node sets may be utilized. It is also not required that any program object have the same number of nodes as any other program object. For instance, program object 22 may have five node sets, with each node set comprising an instruction node, a result node, and a flow control node. Program object 36, however, may require eight node sets, each with an instruction node, a result node, and a flow control node. The number and types of nodes required to be within a particular program object is primarily dependent upon the complexity of that program object.

Although each instruction node 24, 26, 38, and 40 may contain one, two or more instructions to be performed, and each may comprise the same or different instruction sets, instruction nodes 24, 26, 38, and 40 all operate in a similar fashion. Thus, in order to avoid overcomplicating the disclosure, only instruction node 24 will be described.

Instruction node 24 contains instructions that need to be carried out before proceeding further in a work flow. For instance, in a situation where program object 22 handles the procurement of items stocked in a warehouse, instruction node 24 might contain instructions to determine current inventory, determine current demand, and/or request updates to inventory when previously placed orders arrive on the receiving dock. In this instance, user interface 50 might be designed to allow a system user on the receiving dock to provide input to the system which would ultimately update the inventory amounts for certain part numbers. The input from the user might be considered a "result" tied to an instruction in instruction set 24 requesting status on open purchase orders.

User interface 50 may be an HTML form residing on the server computer which is transmitted to a client computer, or may be a form resident on the client computer which a user submits over an active network connection, or may be a form which is completed offline by a user of a client computer.

User interface 50, as well as other similar user interfaces in the system, may comprise standard Hyper-Text Markup Language (HTML) constructs, together with new program object tags which, depending on the information submitted to or received from the work flow process through user interface 50, may alter that work flow process. In order to avoid conflicts and errors when displaying such user interfaces with web browsers and other programs which a user might use to display standard HTML forms, these work flow commands are embedded in a form within an HTML comment line, and are thus ignored by the display tool being used at any given time. However, when the form is submitted to the work flow system, the comment lines are evaluated and acted upon as possible commands together with the standard HTML information within the form.

An example of a work flow command which may be included in a forms-based interface utilized in a medical work flow process, as written with a comment line in HTML format is:

<!__TAS__GL__:Patient:Name=Patient1>
<!__TAS__FOR__EACH__ORDER__[Category=X]>
<!__TAS__LIST__ORDERS__> (other HTML commands)
<!__TAS__END__LIST__ORDERS__>
<!__TAS__END__FOR__EACH__ORDER__>

A typical use of this command structure would be to build the lines above into an HTML form, wherein a user would be required to enter the patient name and search category. When the user submits the form to the work flow system, a universal Common Gateway Interface (CGI) program calls the program object associated with patient orders,. That program object will then query the system to determine the identity and status of all order matching the specified criteria.

Using the command structure above, the work flow system will query the database for all orders in Category X for Patient 1. The orders will then be converted to HTML and displayed to a user in a manner similar to the table below:

| Lab orders | Values |
|---|---|
| H & H | 39 (03/04 9:20) |
| HCT | 43 (03/08 10:03) |
| H & H | 14.3 (03/04 9:20) |
| HgB | 14.8 (03/08 10:03) |
| CBC | Enter result . . . |
| RBC | |
| CBC | Enter result |
| WBC | |
| CBC | Enter result . . . |
| Hct | |
| CBC | Enter result . . . |
| I HgB | |

A user of the work flow process may now either enter results for order which are not complete, as indicated from the values "Enter Result . . .", order additional tests based upon previous results, or alter a diagnosis and treatment. If a diagnosis is amended, the work flow associated with that patient will also change accordingly.

A more complex query might involve organizing the information by date such as in the following:

<!__TAS__GL__:Patient:Name=Patient1>
<!__TAS__ITERATION__ITER=5 TIME=24>
<!__TAS__DATE__TIME
<!__TAS__END__ITERATION__>
<!__TAS__FOR__EACH__ORDER__ Category=Labs
__TAS__ORDER__NAME__
<br>__TAS__ATTRIBUTE__NAME__
<!__TAS__ITERATION__ITER=5 TIME=24>
<!__TAS__LIST__ORDERS__>
__TAS__ORDER__VALUE__
<!__TAS__END__LIST__ORDERS__>
<!__TAS__END__ITERATION__>
<!__TAS__END__FOR__EACH__ORDER__>

Here, the iteration commands

<!__TAS__ITERATION__ITER=iii TIME=jjj>
<!__TAS__DATE__TIME
<!__TAS__END__ITERATION__> creates iii time slots of jjj hours each. In the example above, five time slots of 24 hours each are created.

The command structure

<!__TAS__FOR__EACH__ORDER__ Category=XXX
__TAS__ORDER__NAME__
<!__TAS__END__FOR__EACH__ORDER__> fills a table where the data in each column will be values retrieved from certain attributes of a certain category of orders. The FOR loop enumerates all the major attributes of each lab order in the history. If XXX is replaced with *, every order in the history will be displayed.

Within a loop, the structure

__TAS__LIST__ORDERS__
__TAS__END__LIST__ORDERS__ will list for display the instances of the orders satisfying the previous query.

Thus, the table for patient1 as described using the syntax previously described might be:

| Laboratory | 3/4/96 | 3/5/96 | 3/6/96 | 3/7/96 | 3/8/96 |
|---|---|---|---|---|---|
| | 00:00:00 | 00:00:00 | 00:00:00 | 00:00:00 | 00:00:00 |
| H & H Hct | 39 (3/4 9:20) | N/A | N/A | N/A | 43 (3/8 10:03) |
| H & H HgB | 14.3 (3/4 9:20) | N/A | N/A | N/A | 14.8 (3/8 10:03) |
| CBC RBC | N/A | N/A | N/A | N/A | Enter result . . . |
| CBC WBC | N/A | N/A | N/A | N/A | Enter result . . . |
| CBC Hct | N/A | N/A | N/A | N/A | Enter result . . . |
| CBC HgB | N/A | N/A | N/A | N/A | Enter result . . . |

Other program object tags used in a preferred embodiment of the present invention are listed below, together with a description of the function of each.

| TAG | FUNCTION |
|---|---|
| _TAS_CATEGORY_NAME_ | Display Category name |
| _TAS_DEPARTMENT_NAME_ | Display Department name |
| _TAS_ORDER_NAME_ | Display Order name |
| _TAS_ATTR_NAME_ | Display Attribute name |
| _TAS_ORDER_START_TIME_ | Display Start time |
| _TAS_ORDER_STOP_TIME_ | Display Stop time |
| _TAS_ORDER_VALUE_TIME_ | Display Time Stamp of Value |
| _TAS_ORDER_VALUE_ | Display Value with time stamp (editable) |
| _TAS_ORDER-VALUE_READONLY_ | Display Value with time stamp (read only) |
| _TAS_ORDER_VALUE_ONLY_ | Display Value without time stampe (editable) |
| _TAS_ORDER_VALUE_ONLY_READONLY_ | Display Value without time stamp (read only) |
| _TAS_ORDER_STATUS_ | Display Status with time stamp (editable) |
| _TAS_ORDER_STATUS_READONLY_ | Display Status with time stamp (read only) |
| _TAS_ORDER_STATUS_ONLY_ | Display Status without time stamp (editable) |
| _TAS_ORDER_STATUS_ONLY_READONLY_ | Display Status without time stamp (read only) |
| _TAS_ORDER_SUBTOTAL_ | Display subtotal of the values been in the row |
| _TAS_ORDER_RESULT_ANCHOR_HREF_ | Produce image/document anchored references |
| _TAS_ORDER_RESULT_ANCHOR_ HEADLINES_TABLE> | The anchor for image/document data, the paramater is the anchored reference to jump back to whatever theses data being indexed |
| _TAS_GRAPH_DATA_ <category=CATEGORY Department=DEPARTMENT Order=ROUTINE Attribute=ATTRIBUTE ITER=12 TIME=1 | Displays a trend graph, thus combining a query function and value fetching. |
| _TAS_OK_ | Initiated by a user when the particular form has been filled in as completely as possible. |
| _TAS_SAVE_ | Used to save the form in its current state |
| _TAS_CANCEL_ | Used to quit the current form and discard any information already entered |
| _TAS_HELP_ | Used to get help on any form field |
| _TAS_LOGON_NAME_ | Used when initiating a logon session |
| _TAS_LOGON_PASSWORD_ | Used when initiating a logon session |
| _TAS_LINKOR_HOST_ | Used when initiating a logon sessio |
| _TAS_QUERY_ <category=CATEGORY Department=DEPARTMENT Order=ROUTINE Attribute=ATTRIBUTE ITER=12 TIME=1> | Creates a context containing all of the major attributes of orders satisfying the specified criteria. |

Generating HTML-based forms and writing CGI programs to handle data submitted through the use of an HTML-based form is well-known to those of ordinary skill in the art. However, the use of the unique program object tags described herein and the interface of the forms with a program object and work flow system as described herein is new. The use of these program object tags makes the use CGI program unnecessary, thus saving the time and expense of writing new software unnecessary.

Referring again to FIG. 2, once input from the user is received, it is evaluated by flow control node 32, and, depending on the content of that user input, program flow then proceeds with either instruction node 26 or instruction node 38. In some instances, such as in a factory setting, when the quantity of parts of a given part number is not enough to satisfy demand, the method of the present invention might proceed with both succeeding instruction sets. In this case, the method might proceed with instruction node 38 to update the database, and also with instruction node 26 to order additional pieces of the same part number. This is one example of a work flow being modified as a result of the input received from the user.

Note, that instruction node 38 is within program object 36, which program object is distinct from program object 22 which contained the first set of instruction, results, and flow control. This is for illustrative purposes only, and the actual compositional structure of program objects and methodology used for a particular application may vary, as would be understood by those of ordinary skill in the art.

Instruction node 38 might update the database, receiving the new inventory amount in the results node as a "result" of updating the database. Flow control 46 then ensures that the user supplying the information regarding the received parts is given feedback by transferring control to instruction node 40. Instruction node 40, in addition to updating the user interface 50 as by displaying a result on a computer display, for example, might also "generate" a user interface 52. In a factory setting, user interface 52 might be generated to inquire whether a factory manager wishes to begin a particular project for which the last few outstanding parts have been received.

Figure 3:
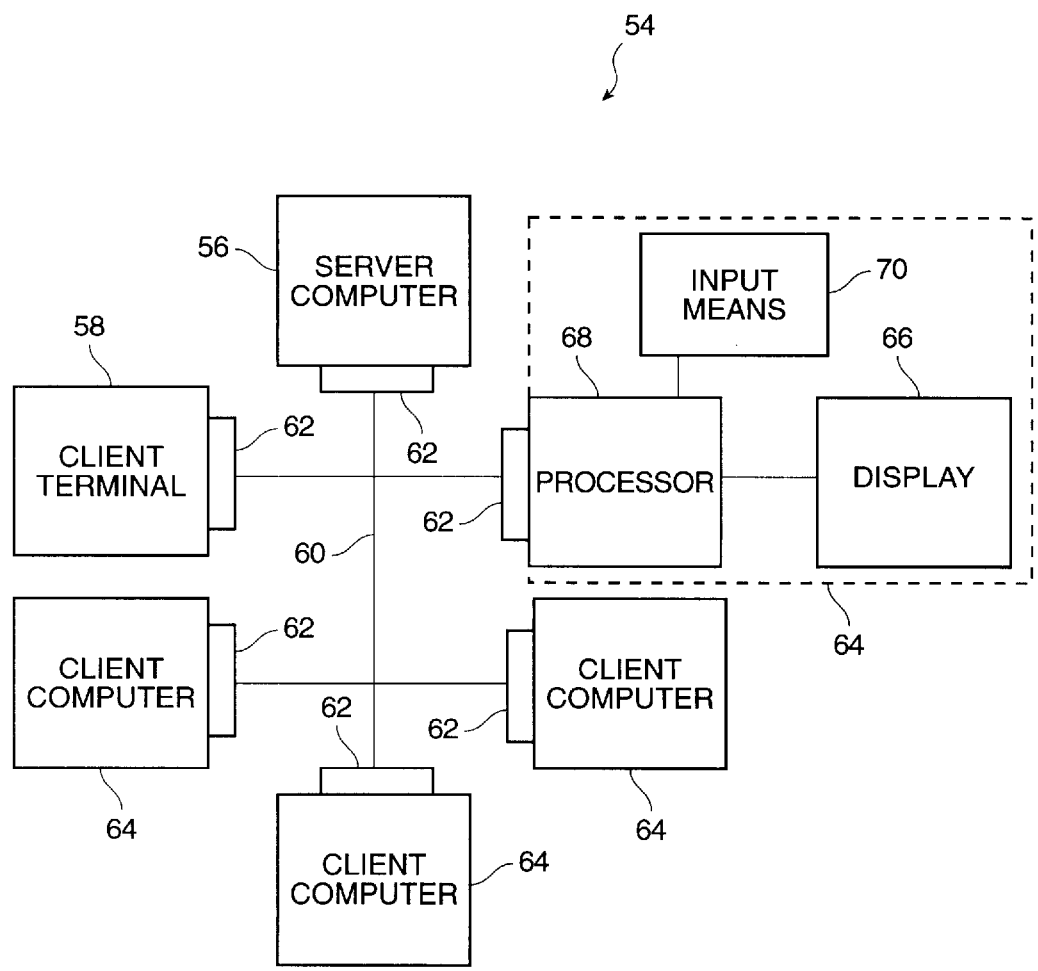
FIG. 3 is a block diagram of a computer network suitable for the practice of the present invention, showing only key components thereof.

FIG. 3 is a block diagram of a computer network suitable for the practice of the present invention.

Referring to FIG. 3, a network 54 comprises a server computer 56 which communicates with client terminal 58 through transmission lines 60. Client terminal 58 may be connected to transmission lines 60 using interface 62 which may comprise a modem, an ethernet interface, or a direct connection, depending on the requirements of client terminal 58. Transmission line 60 may be any suitable computer equipment interconnection in a combination of two or more such interconnections including, for example, telephone networks, Internet, ethernet cable and the like.

Also communicating with server computer 56 are client computers 64 which have a similar interface 62. Terminals such as client terminal 58 are typically incapable of operations requiring sophisticated functions such as the local storing and retrieving of data, or the running of programs independently of the networked computers with which they communicate. Client computers 64 are typically capable of performing functions independently of other networked computers such as other client computers 64 or server computers 56 and the like. It is contemplated by the inventors that information transferred between the client and server computers may take place via electronic store and forward systems, and other conventional network protocols and methods, as would be readily appreciated by those of ordinary skill in the art.

Client computers 64 include a display 66 which is typically a video or other visually perceivable display attached to a computer, but may also include other types of displays, including those perceivable by other human senses, known to those of ordinary skill in the art. The type of display is not critical to the invention.

Also included in a client computer 64 is a processor 68 which processes program instructions as they are issued, and an input means 70 which is used by users of client computers to input data into forms provided for that purpose. It is contemplated that input means 68 may be a conventional keyboard, a microphone where voice commands may be issued into the microphone and converted to a form recognized by the server computer for use, as known to those of ordinary skill in the art, or other suitable input device.

While illustrative embodiments and applications of this invention have been shown and described, it would be apparent to those of ordinary skill in the art that many more modifications than have been mentioned above are possible without departing from the inventive concepts set forth herein. The invention, therefore, is not to be limited except in the spirit of the appended claims.

What is claimed is:

1. In a process flow system for managing a process flow, said system managed by a computer processor, the process flow having a node from which more than one process branch emerges, wherein a forms-based user interface comprising function tags is a source of input by a user, and wherein the forms-based user interface communicates with a program object, wherein at least one rule is associated with said program object, a method for selecting at least one of said emergent process branches for execution, the method comprising the steps of:

accepting user data from a user of the process flow system through the forms-based user interface;

causing a program object to process said user data;

combining said user data with other data available within the process flow system to form a first set of data;

causing the program object to determine whether additional data is required to complete an analysis of which process branches leading from the node to select;

causing the computer processor, if additional data is not required, to compare said first set of data with at least one rule associated with the program object to determine which process branches to select; and causing the selected process flow branches to be executed.

2. The method of claim 1 further comprising the steps of:

causing the computer processor to compare said first set of data to at least one rule associated with the program object to select at least two process branches to execute, wherein in said causing the program object step it is determined that additional data is required and said data is obtained;

causing said at least two process branches to be executed until said second set of data is obtained;

combining said first set of data with said second set of data to form a third set of data once said second set of data is obtained;

causing the computer processor to compare said third set of data with at least one said rule to determine which process branch or branches to execute or to continue to be executed; and terminating execution of process branches which are determined to be not required.

3. A data processing apparatus including a process flow system for managing a process flow, said system managed by a computer processor the process flow having a node from which more than one process branch emerges, wherein a forms-based user interface comprising function tags is a source of input by a user, and wherein the forms-based user interface communicates with a program object, wherein at least one rule is associated with said program object, a method for selecting at least one of said emergent process branches for execution, said data processing apparatus further comprising:

means for accepting user data from a user of the process flow system through the forms-based user interface;

means for causing a program object to process said user data;

means for combining said user data with other data available within the process flow system to form a first set of data;

means for causing the program object to determine whether additional data is required in order to complete an analysis of which process branches leading from the node to select;

means for causing the computer processor, if additional data is not required, to compare said first set of data with at least one rule associated with the program object to determine which process branches to select; and means for causing the selected process flow branches to be executed.

4. A data processing apparatus according to claim 3 further comprising:

means for causing the computer processor to compare said first set of data to the at least one rule associated with the program object to select at least two process branches to execute, wherein said means for causing the program object determines that additional data is required and said data is obtained by said means for causing the program object;

means for causing said at least two process branches to be executed until said second set of data is obtained;

means for combining said first set of data with said second set of data to form a third set of data once said second set of data is obtained;

means for causing the computer processor to compare said third set of data with at least one said rule to determine which process branch or branches to execute or to continue to be executed; and means for terminating execution of process branches which are determined to be not required.

* * * * *